United States Patent
Suzuki et al.

(10) Patent No.: US 11,555,234 B2
(45) Date of Patent: Jan. 17, 2023

(54) STEEL SHEET (71) Applicant: NIPPON STEEL CORPORATION, Tokyo (JP)

(72) Inventors: Yuya Suzuki, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/428,239

(22) PCT Filed: Apr. 24, 2020

(86) PCT No.: PCT/JP2020/017832
§ 371 (c)(1),
(2) Date: Aug. 3, 2021

(87) PCT Pub. No.: WO2020/218575
PCT Pub. Date: Oct. 29, 2020

(65) Prior Publication Data
US 2022/0119928 A1 Apr. 21, 2022

(30) Foreign Application Priority Data
Apr. 24, 2019 (JP) .............................. JP2019-083265

(51) Int. Cl.
C22C 38/58 (2006.01)
C22C 38/00 (2006.01)
(Continued)

(52) U.S. Cl.
CPC ............ *C22C 38/58* (2013.01); *B32B 15/013* (2013.01); *C22C 38/001* (2013.01);
(Continued)

(58) Field of Classification Search
CPC ..... C22C 38/58; C22C 38/001; C22C 38/002; C22C 38/02; C22C 38/06; C22C 38/42;
(Continued)

(56) References Cited

U.S. PATENT DOCUMENTS

2019/0017156 A1  1/2019  Kawamura et al.
2020/0325554 A1  10/2020 Takeda et al.

FOREIGN PATENT DOCUMENTS

| CN | 108474069 A | | 8/2018 |
| JP | 2011111673 A | * | 6/2011 |
| JP | 6388099 B1 | | 9/2018 |

OTHER PUBLICATIONS

Azuma et al., JP-2011111673-A Google Patents Translation, Jun. 9, 2011, entire translation (Year: 2011).*

* cited by examiner

Primary Examiner — Humera N. Sheikh
Assistant Examiner — Katherine A Christy
(74) Attorney, Agent, or Firm — Birch, Stewart, Kolasch & Birch, LLP (57) ABSTRACT The present invention relates to steel sheet realizing both formability and weldability. The steel sheet of the present invention is characterized in that at a surface layer part of a region down to 30 μm from the surface of the steel sheet in the sheet thickness direction, Si oxide grains are present in 3000 to 6000/mm² in number density, an average of natural logarithms of the particle sizes of the Si oxide grains measured in μm units is −2.0 to −1.2, the standard error of the natural logarithms of the particle sizes is 0.6 or less, and the number of Si oxide grains with deviations of the natural logarithms of the particle sizes from the average larger than 2 times the standard error is 5% or less of the total number (Continued)

of Si oxide grains and at a position of ½ of the thickness of the steel sheet, the number density of the Si oxide grains is 1000/mm² or less.

4 Claims, 1 Drawing Sheet

(51) Int. Cl.
*B32B 15/01* (2006.01)
*C22C 38/54* (2006.01)
*C22C 38/02* (2006.01)
*C22C 38/48* (2006.01)
*C22C 38/46* (2006.01)
*C22C 38/44* (2006.01)
*C22C 38/42* (2006.01)
*C22C 38/06* (2006.01)
*C22C 38/50* (2006.01)

(52) U.S. Cl.
CPC ............ *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01)

(58) Field of Classification Search
CPC ......... C22C 38/46; C22C 38/48; C22C 38/50; C22C 38/54; B32B 15/013
USPC .......................................................... 428/659
See application file for complete search history.

STEEL SHEET

FIELD

The present invention relates to steel sheet.

BACKGROUND

In recent years, from the viewpoint of improvement of the fuel efficiency etc. of automobiles for the purpose of environmental conservation, steel sheet for automobile use is being made higher in strength and thinner in thickness so as to lighten the weight of automobiles. Further, the steel sheet used for auto parts is formed into various shapes, so excellent formability is demanded. Furthermore, in the process of assembly of automobiles, the formed parts are welded together, so good weldability is also important as a criteria for selection of the steel sheet used for the structural parts of automobiles.

In this regard, in welding steel sheet which has been galvanized, in particular high strength steel sheet, for example, as described in the following PTL 1, sometimes the drop in weldability due to liquid metal embrittlement (LME) cracking becomes a problem. LME cracking is believed to occur due to the molten zinc penetrating the austenite grain boundaries at the surface layer part of the steel sheet at the time of welding and causing the steel sheet to become brittle and further tensile stress being applied to the steel sheet at the time of welding.

CITATIONS LIST

Patent Literature

[PTL 1] Japanese Patent No. 6388099

SUMMARY

Technical Problem

As explained above, LME cracking is believed to occur due to molten zinc penetrating the austenite grain boundaries of the surface layer part of the steel sheet. For this reason, the weldability of steel sheet is believed to be greatly affected by the state of the surface layer part. Therefore, the present invention has as its object the provision of steel sheet realizing both formability and weldability.

Solution to Problem

The inventors thought that by suppressing the penetration of molten zinc into the austenite grain boundaries of the surface layer part of steel sheet, it would be possible to suppress LME cracking and improve the weldability of steel sheet.

First, the inventors prepared several steel sheets with large numbers of Si oxide grains distributed at the surface layer part and investigated the weldability of these steel sheets. As a result, these steel sheets were all improved in weldability. The mechanism of this effect is not completely clear, but is believed to be as follows:

The Si oxide grains distributed at the surface layer part of steel sheet can promote ferrite transformation by forming nucleation sites of ferrite during cooling at the time of welding. Further, even if Si oxide grains dissolve at a high temperature during welding, the solute Si acts as a ferrite former and therefore ferrite transformation can be promoted. If ferrite transformation is promoted in this way, a large amount of ferrite is formed at the austenite grain boundaries. Further, at the surface layer part of steel sheet, it is believed that penetration of molten zinc into the austenite grain boundaries will be suppressed by the ferrite formed at the austenite grain boundaries. As a result, it is believed that LME cracking will be suppressed and the weldability of the steel sheet will be improved.

However, it is known that depending on the state of distribution of Si oxide grains, the weldability will be improved while the formability will deteriorate. The inventors continued with more detailed investigation. As a result, the inventors discovered that suitably controlling the distribution of Si oxide grains at the surface layer part of steel sheet is important for preventing deterioration of the formability.

The gist of the present invention obtained in the above way is as follows:

(1) A steel sheet with a tensile strength of 600 MPa or more, a region down to 30 μm from a surface of the steel sheet in a sheet thickness direction being defined as a "surface layer part", at the surface layer part of at least one side, particle size 20 nm or more Si oxide grains being present in a 3000 to 6000/mm$^2$ or less number density, an average of natural logarithms of the particle sizes of the Si oxide grains measured in m units being −2.0 to −1.2, a standard error of the natural logarithms of the particle sizes being 0.6 or less, a number of Si oxide grains with deviations of the natural logarithms of the particle sizes from the average larger than 2 times the standard error being 5% or less of the total number of Si oxide grains with particle sizes of 20 nm or more, a chemical composition at a position of ¼ of the thickness from the surface of the steel sheet comprising, by mass %, C: 0.050 to 0.800%, Si: 0.01 to 2.50%, Mn: 0.01 to 8.0%, P: 0.1000% or less, S: 0.0500% or less, Al: 0.050% or less, N: 0.0100% or less, O: 0 to 0.020%, Cr: 0 to 3.00%, Mo: 0 to 1.00%, B: 0 to 0.0100%, Ti: 0 to 0.200%, Nb: 0 to 0.200%, V: 0 to 0.20%, Cu: 0 to 1.000%, Ni: 0 to 1.000%, and bal.: Fe and impurities, and a number density of Si oxide grains at a position of ½ of the thickness of the steel sheet being 1000/mm$^2$ or less.

(2) The steel sheet of (1), wherein the chemical composition further comprises at least one element selected from the group consisting of Cr: 0.01 to 3.00%, Mo: 0.01 to 1.00%, B: 0.001 to 0.0100%, Ti: 0.010 to 0.200%, Nb: 0.010 to 0.200%, V: 0.01 to 0.20%, Cu: 0.010 to 1.000%, and Ni: 0.010 to 1.000%.

(3) The steel sheet of (1) or (2), wherein the steel sheet further comprises a hot dip galvanized layer, a hot dip galvannealed layer, or an electrogalvanized layer at the surface of the surface layer part.

Advantageous Effects of Invention

According to the present invention, it is possible to provide steel sheet able to realize both formability and weldability. Such steel sheet of the present invention is suitable as a material for auto parts etc.

DESCRIPTION OF EMBODIMENTS

Below, embodiments of the present invention will be explained. Note that, the embodiments shown below are for facilitating understanding of the present invention and must not be interpreted as limiting the present invention. The present invention can be changed and improved from the following embodiments without departing from the gist. Note that, the "to" in expressions of the numerical ranges means inclusion of the numerical value at the left side as the lower limit and the numerical value of the right side as the upper limit.

The tensile strength of the steel sheet according to the present embodiment is made 600 MPa or more, preferably is made 900 MPa or more. In the steel sheet according to the present embodiment, the region down to 30 μm from the surface of the steel sheet in the sheet thickness direction is defined as the surface layer part and the region at the inside from the surface layer part in the sheet thickness direction is defined as the center part of the steel sheet. The surface layer part of steel sheet according to the present embodiment satisfies the conditions explained below:

Si oxide grains are present at the surface layer part on at least one side of the steel sheet. The surface layer part may be formed at only one side of the steel sheet or may be formed at both sides of the steel sheet. In the present embodiment, the number density of the Si oxide grains is 3000 to 6000/mm$^2$. Furthermore, the particle sizes of the Si oxide grains in the present embodiment respectively fall in line with the following particle size distribution. That is, the natural logarithms of the particle sizes of the Si oxide grains measured in m units are on the average −2.0 to −1.2 and the standard error is 0.6 or less. Further, among the Si oxide grains, the number of ones with deviations of the natural logarithms of the particle sizes from the average of more than 2 times the standard error is 5% or less of the number of all Si oxide grains to be measured at the surface layer part. By satisfying the condition of the above Si oxides, it becomes possible to realize both formability and weldability of high strength steel sheet having a 600 MPa or more, preferably 900 MPa or more tensile strength.

The average of the natural logarithms of the particle sizes of the Si oxide grains measured in μm units is −1.2 or less. Due to this, coarse Si oxide grains are kept from becoming starting points for cracking at the time of shaping of the steel sheet and the formability of the steel sheet is kept from deteriorating. From this viewpoint, this average is more preferably −1.3 or less, still more preferably −1.5 or less. Note that, in the present invention, the "formability" indicates the total elongation obtained by taking a Japan Industrial Standard JIS No. 5 test piece perpendicular to the rolling direction from the steel sheet and subjecting the test piece to a tensile test based on JIS Z 2241 (2011). On the other hand, by the average of the natural logarithms of the Si oxide grains measured in m units being made −2.0 or more, the weldability of the steel sheet is improved. From this viewpoint, the average is preferably −1.9 or more, more preferably −1.7 or more.

Further, the standard error of the natural logarithms of the particle sizes of the Si oxide grains measured in m units is 0.6 or less. Due to this, it is possible to keep coarse Si oxide grains from becoming starting points for cracking at the time of shaping of the steel sheet and keep the formability of the steel sheet from deteriorating. The lower limit of the standard error is ideally 0. However, making the lower limit of the standard error less than 0.1 is difficult technically. For this reason, the lower limit of the standard error may be made 0.1.

Further, in the above particle size distribution, the ratio of the Si oxide grains with natural logarithms of the particle sizes more than 2 times the standard error from the average is 5% or less of the total Si oxide grains. By the particle sizes of the Si oxide grains being controlled in this way, it is possible to keep coarse Si oxide grains from becoming starting points for cracking at the time of shaping of the steel sheet and keep the formability of the steel sheet from deteriorating. The lower limit of the above ratio is ideally 0. However, making the above ratio less than 1% is difficult technically, so the lower limit may be made 1%.

The number density of the large number of Si oxide grains present at the surface layer part of at least one side of the steel sheet is 3000 to 6000/mm$^2$. By making the number density of Si oxide grains present at the surface layer part of the steel sheet 3000/mm$^2$ or more, LME cracking is suppressed and the weldability is improved. On the other hand, by making the number density of Si oxide grains present at the surface layer part of the steel sheet 6000/mm$^2$ or less, the formability of the steel sheet is kept from deteriorating. From this viewpoint, the number density of the Si oxide grains is more preferably 5500/mm$^2$ or less, still more preferably 5000/mm$^2$ or less.

Further, the above such large number of Si oxide grains may be present beyond the surface layer part of the range down to 30 μm from the surface. If a large number of Si oxide grains are present at both sides of the steel sheet, the respective surface layer parts may be formed under similar conditions or the respective surface layer parts may be formed under mutually different conditions. At that time, if one of the surface layer parts satisfies the above conditions, the other of the surface layer parts need not satisfy the above conditions, but preferably both of the surface layer parts satisfy the above conditions. If making the surface layer part satisfying the above conditions the joined surface, LME cracking can be suppressed.

In the present invention, "the number density of Si oxide grains at the surface layer part" and "the particle size distribution of Si oxide grains at the surface layer part" are determined in the following way.

The number and particle sizes of the Si oxide grains can be identified by examination of a cross-section parallel to the rolling direction of the steel sheet and the sheet thickness direction by a power of 10000×. Specifically, first, the cross-section of the cutout steel sheet is finished to a mirror surface by mechanical polishing, then a Nital etchant is used to bring out the steel structures. After that, the steel structures are examined using a scanning electron microscope (SEM) at a 0.04 mm$^2$ region (region included in surface layer part) centered about a position of 15 μm from the surface of the steel sheet in the sheet thickness direction (position of ½ of thickness of the surface layer part). The value of the thus observed and counted number of Si oxide grains converted to the number per mm$^2$ is made the "number density of Si oxide grains of the surface layer part". Further, the particle sizes of Si oxide grains obtained by measurement in that region (circumscribing circle equivalent diameter) and the frequency at which the values of the particle sizes are measured are made the "particle size distribution of Si oxide grains of the surface layer part". Here, the Si oxide grains included in the above number of Si oxide grains are made ones with particle sizes of 20 nm or more.

The mechanism of this effect is not completely clear, but is believed to be as follows: If the particle sizes of the Si oxide grains present at the surface layer part do not fall in line with the above particle size distribution, there may tend to be many coarse Si oxide grains present at the surface layer part. These coarse Si oxide grains become causes of concentration of strain and stress at the time of shaping the steel sheet and may become starting points for cracking by formation of voids. On the other hand, by the particle sizes of the large number of Si oxide grains distributed at the surface layer part falling in line with the above particle size distribution, in this way, ferrite transformation can be promoted while cracking due to coarse Si oxide grains can be kept from occurring. For this reason, it is believed the formability of the steel sheet can be kept from deteriorating while the weldability can be improved.

Note that, no notable effect on the weldability of steel sheet could be recognized due to the number density or particle sizes of Si oxide grains at portions other than the surface layer part of the steel sheet. From this, even if using sheets which had been considered disadvantageous for weldability in the past such as the excellent ductility (Dual Phase) steel or TRIP (transformation induced plasticity) steel for the center part of the steel sheet, it is possible to obtain steel sheet excellent in weldability by forming the surface layer part in the above way. This point is one of the superior points of the present invention.

However, from the viewpoint of suppressing deterioration of the formability of steel sheet, the number density of the Si oxide grains present at the center part of the steel sheet is preferably small. Specifically, the number density of Si oxide grains at the center of the steel sheet in the sheet thickness direction (position of ½ of the thickness) is made $1000/mm^2$ or less. In this region, the region of 0.04 $mm^2$ centered at the position of ½ of the thickness is examined for steel structures by a power of 10000× in the same way as above. The value of the number of Si oxide grains counted by observation in this way converted to the number per $mm^2$ is made the number density of the Si oxide grains at the center part of the steel sheet.

By modifying the surface layer part in this way, it is possible to obtain steel sheet realizing both formability and weldability.

Next, the chemical composition of the steel sheet of the present invention will be explained. In the steel sheet of the present invention, the chemical composition at the center part of the steel sheet preferably satisfies the following conditions. The chemical composition of the center part of the steel sheet shall mean the chemical composition measured the position of ¼ of the thickness from the surface of the steel sheet. The "%" regarding the content of elements mean "mass %" unless otherwise indicated.

"C: 0.050 to 0.800%"

C is an element raising the strength of steel sheet. To obtain the effect of sufficiently raising the strength of steel sheet, the content of C is made 0.050% or more. Further, by the content of C being 0.800% or less, the toughness of the steel sheet can be kept from dropping. From this viewpoint, the content of C is preferably 0.600% or less, more preferably is 0.500% or less.

"Si: 0.01 to 2.50%"

Si is an element stabilizing the ferrite. That is, Si raises the Ac3 transformation point, so it is possible to form a large amount of ferrite in a broad range of annealing temperatures. This is added from the viewpoint of improvement of the controllability of the structures of the steel sheet. To obtain such an effect by Si, the content of Si is made 0.01% or more. In addition, Si is an element suppressing the coarsening of iron-based carbides and raising the strength and formability of steel sheet. Further, Si is added as a solution strengthening element for contributing to higher strength of steel sheet. From these viewpoints, the content of Si is more preferably 1.00% or more, still more preferably 1.20% or more. However, if the content of Si becomes greater, sometimes the steel sheet becomes brittle and the ductility deteriorates. For this reason, the content of Si is made 2.50% or less. The content of Si is preferably 2.20% or less, more preferably 2.00% or less.

"Mn: 0.1 to 8.0%"

Mn is an element raising the hardenability of steel. To obtain such an effect by Mn, the content of Mn is made 0.1% or more. From the viewpoint of keeping Mn from segregating and the difference in hardness from becoming too great, the content of Mn is preferably 8.0% or less, more preferably 5.0% or less, still more preferably 4.0%, still more preferably 3.0% or less.

"P: 0.1000% or less"

P is an element sometimes segregating and causing embrittlement of the weld zone. For this reason, the content of P is preferably small. Specifically, the content of P is made 0.1000% or less. The lower limit of the content of P is 0. Making the content of P less than 0.0010% is economically disadvantageous, so 0.0010% may be made the lower limit.

"S: 0.0500% or less"

S is an element sometimes having a detrimental effect on the weldability of steel sheet and the manufacturability at the time of casting and the time of hot rolling. For this reason, the content of S is preferably small. Specifically, the content of S is made 0.0500% or less. The lower limit of the content of S is 0. Making the content of S less than 0.00010% is economically disadvantageous, so 0.0001% may be made the lower limit. The content of S may also be 0.0010% or more.

"Al: 0.050% or less"

Al is an element acting as a deoxidizer and is added in the deoxidation process according to need. If using Al as a deoxidizer, Al sometimes remains in the steel sheet, so 0.050% or less of Al may also be contained. There is no need for Al to be contained, so the lower limit is 0. From the viewpoint of manufacturing ability, the lower limit may be made 0.0001%.

"N: 0.0100% or less"

N sometimes forms coarse nitrides and causes deterioration of the bendability of steel sheet. Further, N sometimes causes formation of blowholes at the time of welding. Accordingly, the content of N is preferably small. Specifically, the content of N is made 0.0100% or less. The lower limit of the content of N is 0. Making the content of N less than 0.0005% is economically disadvantageous, so 0.0005% may be made the lower limit.

"O: 0 to 0.020%"

O is an element required for forming Si oxides at the surface layer. However, if Si oxides are formed at the surface layer part, O need not be present at a position of ¼ of the thickness from the surface. Therefore, the lower limit of content of O at the position of ¼ of the thickness from the surface may be 0. However, to efficiently form Si oxides at the surface layer part, 0.001% may be made the lower limit. If the amount of O of the position of ¼ of the thickness from the surface becomes greater, the elongation falls, so the upper limit is made 0.020%.

The balance of the chemical composition of the center part of the steel sheet is comprised of Fe and impurities. However, instead of part of Fe, the following contents may also be contained.

"Cr: 0 to 3.00%, Mo: 0 to 1.00%, and B: 0 to 0.0100%"

Cr, Mo, and B are respectively elements raising the hardenability of steel to contribute to improvement of the strength of the steel sheet. The effect by these elements being included is obtained even if the contents of these elements are small amounts. The contents of these elements may be 0% as well, but to sufficiently obtain the above effects, preferably the content of Cr is 0.01% or more, the content of Mo is 0.01% or more, and the content of B is 0.0001% or more. On the other hand, from the viewpoint of keeping the pickling ability, weldability, hot formability, etc. of the steel sheet from deteriorating, the content of Cr is made 3.00% or less, the content of Mo is made 1.00% or less, and the content of B is made 0.0100% or less.

"Ti: 0 to 0.200%, Nb: 0 to 0.200%, and V: 0 to 0.20%"

Ti, Nb, and V are respectively elements contributing to improvement of the strength of steel sheet. These elements contribute to improvement of the strength of steel sheet by precipitation strengthening and suppression of growth of ferrite crystal grains for strengthening fine grains and suppression of recrystallization for dislocation strengthening. The effect by these elements being included is obtained by the contents of these elements even in small amounts. The contents of these elements may be 0% as well, but to sufficiently obtain this effect, preferably the respective contents of Ti and Nb are 0.010% or more and the content of V is 0.01% or more. However, from the viewpoint of keeping the formability of the steel sheet from deteriorating due to the precipitation of carbonitrides increasing, the respective contents of Ti and Nb are made 0.200% or less and the content of V is made 0.20% or less.

"Cu: 0 to 1.000% and Ni: 0 to 1.000%"

Cu and Ni are respectively elements contributing to improvement of the strength of steel sheet. The effect by these elements being included is obtained by the contents of these elements even in small amounts. The contents of these elements may be 0% as well, but to sufficiently obtain this effect, preferably the respective contents of Cu and Ni are 0.010% or more. On the other hand, from the viewpoint of keeping the pickling ability, weldability, hot formability, etc. of the steel sheet from deteriorating, the respective contents of Cu and Ni are made 1.000% or less.

Furthermore, at the center part of the steel sheet, the following elements may be intentionally or unavoidably included in place of part of the Fe in a range where the effect of the present invention is obtained. That is, the steel sheet of the present embodiment may contain W: 0 to 0.1%, Ta: 0 to 0.1%, Sn: 0 to 0.05%, Sb: 0 to 0.05%, As: 0 to 0.05%, Mg: 0 to 0.05%, Ca: 0 to 0.05%, Zr: 0 to 0.05%, and Y: 0 to 0.05%, La: 0 to 0.05%, Ce: 0 to 0.05% or less, and other REMs (rare earth metals).

Note that, the steel sheet of the present invention may further include a hot dip galvanized layer, hot dip galvannealed layer, or electrogalvanized layer on the surface of the surface layer part. In this way, even if a coating layer is formed, the steel sheet of the present invention can realize both formability and weldability by modification of the surface layer part in the above way.

Next, one example of the method for manufacture for obtaining the steel sheet of the present invention will be explained.

The present invention lies in the point of controlling the particle sizes of the large number of Si oxide grains contained in the surface layer part so as to fall in line with the above particle size distribution. Below, the method for manufacturing the steel sheet of the present invention controlling the number density and particle sizes of the Si oxide grains will be explained. Note that, the steel sheet of the present invention includes hot rolled steel sheet, cold rolled steel sheet, plated steel sheet, etc.

Hot Rolled Steel Sheet

In the present embodiment, the method for manufacturing hot rolled steel sheet is not particularly limited. For example, the method of adding wire to control the distribution of Si oxide grains at the surface layer part, the method of separately manufacturing steel sheet corresponding to the center part of steel sheet and steel sheet corresponding to the surface layer part in which a large number of Si oxide grains are distributed and stacking and joining these steel sheets to obtain a multi-layer steel sheet, and the method of adjusting the descaling before rough rolling to leave scale containing Si oxides at the surface of the steel sheet may be illustrated.

Below, the method of adding wire to control the distribution of Si oxide grains at the surface layer part will be explained.

Figure 1:
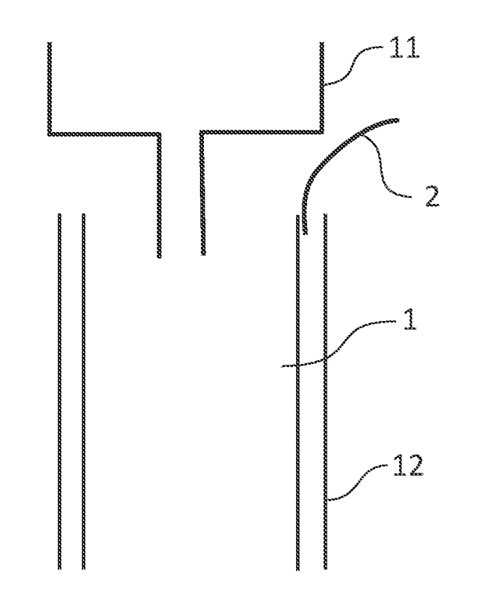
FIG. 1 is a schematic view showing one example of a method of adding iron oxide to a surface layer part of molten steel in a continuous casting process of a method for manufacturing steel sheet of the present invention.

In the process of pouring molten steel satisfying the chemical composition of the center part of steel sheet from a tundish to a continuous casting machine, wire shaped iron oxide is added to a portion corresponding to the surface layer part of the steel sheet to obtain a slab. FIG. 1 is a schematic view showing a method of adding wire shaped iron oxide to the surface layer part of molten steel in a continuous casting process of a method for manufacturing the steel sheet of the present invention. If iron oxide is added to the surface layer part of molten steel in this way, oxygen contained in the iron oxide bonds with Si whereby Si oxide grains are formed.

When adding wire shaped iron oxide to molten steel, 1 mm or more and 50 mm or less diameter wire shaped iron oxide is used. By the diameter of the wire (wire diameter) being made 1 mm or more, the average of the above particle size distribution which the particle sizes of the Si oxide grains should fall in line with may be made −2.0 or more. On the other hand, by the wire diameter being made 50 mm or less, the average of the above particle size distribution may be made −1.2 or less. Further, by the wire diameter being made 50 mm or less, the standard error of the above particle size distribution may be made 0.6 or less.

Further, the wire shaped iron oxide is added to the molten steel by arranging a plurality of wires in the width direction of the molten steel so that the centers of the wires pass through positions away from the surface of the molten steel by the wire diameters (mm units) or more and the wire diameters (mm units)+30 mm or less and so that the distances between the centers of the wires become the wire diameters (mm units) or more and the wire diameters (mm units)+30 mm or less. By the positions of the centers of the wires and the distances of the wires being controlled in this way, the distribution of Si oxides of the surface layers of the steel sheet and the number density of the Si oxides at the inner layer of the steel sheet can be suitably adjusted.

Further, wire shaped iron oxide is added to the molten steel so that the difference in the feed rate of the wire and the flow rate of molten steel becomes −500 mm/min or more and 500 mm/min or less. By the iron oxide being added to the molten steel in this way, the number density of the Si oxide grains at the surface layer part can be controlled to 3000/$mm^2$ or more and 6000/$mm^2$ or less. The faster the feed rate of the wire, the smaller the number density of the Si oxide grains tends to become. The slower the feed rate of the wire, the larger the number density of Si oxide grains tends to become.

After forming a slab having a layer forming the center part of the steel sheet and a surface layer part in which Si oxide grains are distributed in the above way, the slab is heated by a 1100° C. or more and 1350° C. or less, preferably more than 1150° C. and 1350° C. or less heating temperature. By the heating temperature of the slab being made 1100° C. or more, anisotropy of the crystal orientations due to casting can be suppressed. On the other hand, by making the heating temperature of the slab 1350° C. or less, a major increase in the manufacturing costs can be suppressed.

After heating the slab in the above way, the slab is supplied to the hot rolling. This hot rolling process includes a rough rolling process and a finish rolling processing of a finishing temperature of 800° C. or more and 980° C. or less. By making the finishing temperature of the hot rolling 800° C. or more, it is easy to keep the rolling reaction force from becoming higher and stably obtain the desired sheet thickness. On the other hand, by making the finishing temperature of the hot rolling 980° C. or less, it is possible to end the hot rolling even without using a separate heating apparatus in the process from ending the heating of the slab to the completion of the hot rolling and to suppress any major increase in the manufacturing costs of the steel sheet.

After that, the steel sheet hot rolled in the above way is cooled until 550° C. or more and 750° C. or less in temperature by an average cooling rate of 2.5° C./s or more. This cooling process is a process required for rendering the majority of the steel sheet low temperature transformed structures and making the steel sheet higher in strength. By the average cooling rate being made 2.5° C./s or more, ferrite transformation or pearlite transformation is suppressed and a drop in strength of the steel sheet can be suppressed. The average cooling rate is preferably 5° C./s or more, more preferably 10° C./s or more. However, at a temperature higher than 750° C., ferrite transformation or pearlite transformation becomes hard to occur, so the average cooling rate is not limited. Further, at a temperature lower than 550° C., the structures transform to low temperature transformed structures, so the average cooling rate is not limited.

Next, the steel sheet cooled in this cooling process is coiled up. In this coiling process, the coiling temperature is made 550° C. or less. By making the coiling temperature 550° C. or less, ferrite transformation or pearlite transformation at the surface layer part of the steel sheet is suppressed. The coiling temperature is preferably 500° C. or less, more preferably 300° C. or less. In this way, it is possible to obtain the coiled up hot rolled steel sheet of the present invention.

Cold Rolled Steel Sheet

Next, an example of the method for manufacturing cold rolled steel sheet in the steel sheet encompassed by the present invention will be explained.

First, a slab is obtained in the same way as the above example of hot rolled steel sheet, then the slab is heated in the same way as the example of manufacture of hot rolled steel sheet and hot rolled. After that, in the same way as the example of manufacture of hot rolled steel, the steel sheet which was hot rolled is cooled and coiled. However, in the coiling process, the coiling temperature is made 20° C. or more and 700° C. or less.

Next, the hot rolled steel sheet coiled up in the above way is uncoiled and pickled. This pickling process removes oxides (scale) at the surface of the hot rolled steel sheet. This may be performed one time or divided into several times.

Next, the steel sheet is cold rolled. In this cold rolling process, preferably the total reduction rate is 85% or less. By the total rolling reduction being made 85% or less, the ductility of the center part of the steel sheet is kept from dropping and the center part of the steel sheet is kept from fracturing during cold rolling. On the other hand, to sufficiently promote recrystallization in the next annealing process, the total rolling reduction in the cold rolling process is preferably 20% or more, more preferably 30% or more.

Before cold rolling, to reduce the cold rolling load, the steel sheet may be annealed at 700° C. or less in temperature.

After the cold rolling process, the steel sheet is annealed. In this annealing process, to make the steel sheet higher in strength, it is important to make the majority of the structures of the steel sheet low temperature transformed structures and suppress ferrite transformation and pearlite transformation. In the annealing process, first, the steel sheet is held at the Ac3 point −50° C. or more and 900° C. or less in temperature at the center part of the steel sheet for 5 seconds or more. The reason for making the heating temperature the Ac3 point −50° C. or more at the center part of the steel sheet is that by heating the center part of the steel sheet to the dual-phase region of ferrite and austenite or the single phase region of austenite, by subsequent heat treatment, transformed structures are obtained and steel sheet having the desired strength is obtained. On the other hand, by making the heating temperature in the annealing process 900° C. or less, it is possible to keep the prior austenite grains at the center part of the steel sheet from becoming coarser and to keep the toughness of the steel sheet from deteriorating.

Note that, the Ac3 point is found by the following formula:

$$Ac3(° C.)=910-203\sqrt{C}+44.7Si-30Mn+700P-20Cu-15.2Ni-11Cr+31.5Mo+400Ti+104V+400Al$$

Here, C, Si, Mn, P, Cu, Ni, Cr, Mo, Ti, V, and Al are the contents (mass %) of the elements contained in the slab.

After the above annealing process, the annealed steel sheet can be cooled from 550° C. or more to 750° C. or less in temperature by an average cooling rate of 2.5° C./s or more to obtain the cold rolled steel sheet of the present invention. This cooling process is a process required for making the steel sheet higher in strength. By the average cooling rate being made 2.5° C./s or more, ferrite transformation or pearlite transformation is suppressed and a drop in strength of the steel sheet can be suppressed. The average cooling rate is preferably 5° C./s or more, more preferably 10° C./s or more. However, at a temperature higher than 750° C., ferrite transformation or pearlite transformation becomes hard to occur, so the average cooling rate is not limited. Further, at a temperature lower than 550° C., the structures transform to low temperature transformed structures, so the average cooling rate is not limited. At a temperature of 550° C. or less, the steel sheet may be cooled by a constant cooling rate down to room temperature. The steel sheet may be held at a temperature of 200° C. or more and 550° C. or less to promote bainite transformation or temper the martensite. However, if holding steel sheet at 300° C. or more and 550° C. or less for a long period of time, the strength of the steel sheet may fall, so if holding steel sheet at that temperature region, the holding time is preferably 600 seconds or less.

The above explanation is meant to just illustrate the method of manufacture for obtaining the steel sheet of the present invention. As explained above, the method of manufacture of the steel sheet of the present invention is not limited to method of using the addition of wire for controlling the distribution of Si oxide grains of the surface layer part.

Plated Steel Sheet

Next, an example of the method for manufacturing plated steel encompassed by the present invention will be explained.

The surface of the surface layer part of the cold rolled steel sheet manufactured in this way is hot dip galvanized to obtain hot dip galvanized steel sheet. If hot dip galvanizing it, the coating bath temperature may be the conventionally used condition. That is, the coating bath temperature is, for example, made 440° C. or more and 550° C. or less.

Further, as explained above, after performing hot dip galvanization, hot dip galvannealed steel sheet is obtained by performing heating and alloying treatment. As the heating temperature in the alloying in the case of heating and alloying treatment, the condition applied in the past may be used. That is, the heating temperature of the alloying is, for example, made 400° C. or more and 600° C. or less. The heating method in the alloying is not particularly limited. Direct heating by combustion gas, induction heating, direct resistance heating, and other heating systems suitable for hot dip coating facilities in the past can be used. After the alloying treatment, the steel sheet is cooled to 200° C. or less and is skin-pass rolled in accordance with need.

Further, as the method for manufacturing electrogalvanized steel sheet, the following example may be mentioned. For example, the cold rolled steel sheet is treated before coating by alkali degreasing, rinsing, pickling, and rinsing in that order. After that, the pretreated steel sheet is, for example, electrolytically treated using a liquid circulation type electroplating apparatus, using a plating bath comprised of zinc sulfate, sodium sulfate, and sulfuric acid at a current density of 100 A/dm$^2$ or so until a predetermined plating thickness.

The present invention was made with the object of suppressing liquid metal embrittlement (LME) cracking caused by welding steel sheet which has been galvanized. LME cracking sometimes occurs even if one of the steel sheets to be welded is galvanized steel sheet and the other is steel sheet which has not been galvanized. Even if the steel sheet of the present invention is not galvanized, if what it is welded with is galvanized steel sheet, LME cracking can be suppressed. Therefore, the above-mentioned steel sheet solves the problem of suppression of LME cracking not only in steel sheet which has been galvanized, but also steel sheet which has not been galvanized.

Examples

Thickness 250 mm continuously cast slabs having the chemical compositions shown in Table 1 were manufactured. In the process, wire shaped iron oxide was added under the conditions shown in Tables 2-1 to 2-3 to obtain slabs having Si oxides distributed at the surface layer parts. Whether the wire shaped iron oxide was added to the surface layer parts at one side or the wire shaped iron oxide was added to the surface layer parts at two sides is shown as the "position of surface layer part" in Tables 4-1 to 4-3. The slabs were supplied for hot rolling under conditions of the heating temperatures, finishing temperatures, and coiling temperatures shown in Tables 2-1 to 2-3 to obtain hot rolled steel sheets. For steel sheets to be used as cold rolled steel sheets, after obtaining hot rolled steel sheets as explained above, the sheets were pickled and cold rolled by total reduction rates of 50% then annealed under the conditions shown in Tables 2-1 to 2-3. Further, some of the steel sheets were coated by an ordinary method to obtain plated steel sheets as shown in Tables 2-1 to 2-3.

The results of evaluation of the obtained steel sheets are shown in Tables 3-1 to 4-3. Details of the "number density" of Si oxides at the surface layer parts shown in Tables 4-1 to 4-3, "average", "standard error", and "ratio deviated from average" are as explained above. Further, the chemical compositions at the positions of ¼ of the thickness from the surface of the obtained steel sheet are shown in Tables 3-1 to 3-3. Furthermore, the obtained steel sheets were subjected to tensile tests and welding tests as follows.

The tensile strength (MPa) and total elongation (%) were measured by preparing a JIS No. 5 test piece in accordance with JIS Z 2241 (2011) having a direction perpendicular to the rolling direction as the long axis and subjecting it to a tensile test. In the present embodiment, a case where the tensile strength was 600 MPa or more and the value of the tensile strength×total elongation was 10000 MPa % or more was deemed passing.

Further, the welding test was performed as follows. A 50 mm×80 mm test piece was taken from the steel sheet. A servo motor pressure type single-phase AC spot welder (power frequency 50 Hz) was used to weld plated steel sheet to this test piece. After that, the steel structures in the region of the center part of a nugget of the steel sheet were examined by an optical microscope. In the present embodiment, as a result of this observation, a case where no cracking could be found was deemed passing.

[Table 1]

TABLE 1

| Steel type No. | Slab composition (mass %) | | | | | | | | | | | | | | | | Ac3 (° C.) | Remarks |
|---|---|---|---|---|---|---|---|---|---|---|---|---|---|---|---|---|---|---|
| | C | Si | Mn | P | S | N | O | Al | B | Ti | Nb | V | Mo | Cr | Ni | Cu | | |
| A | 0.527 | 0.06 | 0.9 | 0.0823 | 0.0030 | 0.0006 | 0.002 | 0.005 | 0.0074 | 0.063 | 0.025 | 0.03 | 0.07 | 0.25 | 0.095 | 0.160 | 821 | Inv. steel |
| B | 0.680 | 1.10 | 1.0 | 0.0081 | 0.0083 | 0.0052 | 0.008 | 0.004 | 0.0006 | 0.018 | 0.110 | 0.03 | 0.53 | 0.76 | 0.108 | 0.543 | 775 | Inv. steel |
| C | 0.367 | 1.82 | 2.8 | 0.0106 | 0.0043 | 0.0075 | 0.014 | 0.006 | | | | | | | | | 794 | Inv. steel |
| D | 0.084 | 2.08 | 4.3 | 0.0728 | 0.0257 | 0.0011 | 0.003 | 0.005 | 0.0011 | 0.024 | 0.024 | 0.15 | 0.12 | 0.15 | 0.073 | 0.080 | 893 | Inv. steel |
| E | 0.319 | 0.79 | 5.4 | 0.0110 | 0.0026 | 0.0008 | 0.001 | 0.039 | | | | | | | | | 692 | Inv. steel |
| F | 0.574 | 2.46 | 0.7 | 0.0074 | 0.0047 | 0.0005 | 0.001 | 0.043 | 0.0009 | 0.021 | 0.037 | 0.03 | 0.19 | 1.58 | 0.049 | 0.078 | 865 | Inv. steel |
| G | 0.704 | 1.64 | 0.7 | 0.0057 | 0.0062 | 0.0009 | 0.004 | 0.006 | 0.0056 | 0.026 | 0.033 | 0.02 | 0.82 | 0.19 | 0.259 | 0.284 | 825 | Inv. steel |
| H | 0.632 | 0.99 | 1.2 | 0.0095 | 0.0137 | 0.0011 | 0.008 | 0.004 | | | | | | | | | 765 | Inv. steel |
| I | 0.496 | 0.21 | 0.6 | 0.0193 | 0.0369 | 0.0081 | 0.001 | 0.005 | 0.0005 | 0.113 | 0.157 | 0.02 | 0.06 | 0.37 | 0.048 | 0.094 | 816 | Inv. steel |
| J | 0.169 | 1.49 | 6.2 | 0.0061 | 0.0037 | 0.0013 | 0.001 | 0.012 | 0.0005 | 0.026 | 0.025 | 0.02 | 0.12 | 0.54 | 0.162 | 0.745 | 709 | Inv. steel |
| K | 0.790 | 2.29 | 0.8 | 0.0080 | 0.0033 | 0.0007 | 0.003 | 0.005 | 0.0011 | 0.148 | 0.047 | 0.12 | 0.07 | 2.26 | 0.846 | 0.130 | 849 | Inv. steel |
| L | 0.139 | 0.89 | 1.8 | 0.0157 | 0.0419 | 0.0010 | 0.001 | 0.009 | | | | | | | | | 835 | Inv. steel |
| M | 0.277 | 0.62 | 1.9 | 0.0258 | 0.0054 | 0.0005 | 0.009 | 0.003 | 0.0010 | 0.028 | 0.026 | 0.04 | 0.07 | 0.17 | 0.061 | 0.110 | 806 | Inv. steel |
| N | 0.227 | 1.64 | 2.5 | 0.0518 | 0.0050 | 0.0030 | 0.005 | 0.027 | | | | | | | | | 859 | Inv. steel |
| O | 0.436 | 0.37 | 0.6 | 0.0038 | 0.0035 | 0.0018 | 0.001 | 0.004 | 0.0010 | 0.025 | 0.027 | 0.03 | 0.06 | 2.47 | 0.105 | 0.075 | 764 | Inv. steel |
| P | 0.034 | 0.45 | 1.1 | 0.0100 | 0.0030 | 0.0041 | 0.002 | 0.003 | 0.0008 | 0.028 | 0.113 | 0.02 | 0.05 | 0.19 | 0.080 | 0.103 | 877 | Comp. steel |
| Q | 0.818 | 1.00 | 6.3 | 0.0070 | 0.0023 | 0.0010 | 0.001 | 0.022 | 0.0009 | 0.034 | 0.023 | 0.03 | 0.12 | 0.36 | 0.103 | 0.129 | 608 | Comp. steel |
| R | 0.306 | 1.79 | 2.7 | 0.0113 | 0.0028 | 0.0008 | 0.009 | 0.037 | | | | | 0.12 | 0.36 | | | 819 | Inv. steel |

TABLE 1-continued

| Steel type No. | C | Si | Mn | P | S | N | O | Al | B | Ti | Nb | V | Mo | Cr | Ni | Cu | Ac3 (° C.) | Remarks |
|---|---|---|---|---|---|---|---|---|---|---|---|---|---|---|---|---|---|---|
| S | 0.166 | 1.49 | 2.2 | 0.0063 | 0.0034 | 0.0018 | 0.003 | 0.013 | 0.0018 | 0.024 | | | | | | | 847 | Inv. steel |
| T | 0.232 | 1.54 | 2.5 | 0.0512 | 0.0042 | 0.0033 | 0.001 | 0.028 | | 0.006 | 0.005 | 0.01 | | | | | 857 | Inv. steel |

TABLE 2

| Steel type | Steel No. | Steel sheet | Classification | Continuous casting Iron oxide wire diameter (mm) | Continuous casting Position of center of iron oxide wire (mm) | Continuous casting Distance of iron oxide wire (mm) |
|---|---|---|---|---|---|---|
| A | 1 | Cold rolled sheet | Ex. | 40 | 45 | 61 |
| A | 2 | Cold rolled sheet | Comp. ex. | 0.5 | 5 | 28 |
| A | 3 | Hot rolled sheet | Ex. | 30 | 33 | 59 |
| A | 4 | Cold rolled sheet | Ex. | 42 | 72 | 53 |
| B | 5 | Hot rolled sheet | Ex. | 11 | 31 | 26 |
| B | 6 | Cold rolled sheet | Comp. ex. | 51 | 66 | 65 |
| B | 7 | Hot dip galvanized steel sheet | Ex. | 22 | 32 | 45 |
| B | 8 | Cold rolled sheet | Ex. | 4 | 23 | 23 |
| C | 9 | Cold rolled sheet | Ex. | 31 | 53 | 49 |
| C | 10 | Cold rolled sheet | Ex. | 40 | 62 | 54 |
| C | 11 | Hot rolled sheet | Ex. | 30 | 50 | 55 |
| D | 12 | Cold rolled sheet | Ex. | 43 | 49 | 72 |
| D | 13 | Cold rolled sheet | Ex. | 36 | 45 | 53 |
| D | 14 | Hot rolled sheet | Ex. | 16 | 46 | 43 |
| E | 15 | Cold rolled sheet | Ex. | 28 | 39 | 58 |
| E | 16 | Cold rolled sheet | Comp. ex. | 23 | 32 | 14 |
| E | 17 | Hot rolled sheet | Ex. | 46 | 75 | 48 |
| E | 18 | Cold rolled sheet | Ex. | 30 | 37 | 55 |
| F | 19 | Hot rolled sheet | Ex. | 47 | 75 | 77 |
| F | 20 | Cold rolled sheet | Ex. | 9 | 39 | 33 |
| F | 21 | Cold rolled sheet | Ex. | 34 | 62 | 64 |
| G | 22 | Cold rolled sheet | Ex. | 19 | 26 | 48 |
| G | 23 | Cold rolled sheet | Comp. ex. | 5 | 22 | 10 |
| G | 24 | Cold rolled sheet | Ex. | 31 | 50 | 45 |

| Steel type | Continuous casting Difference of feed rate of iron oxide wire and flow rate of molten steel (mm/min) | Hot rolling Heating temp. (° C.) | Hot rolling Finish temp. of hot rolling (° C.) | Hot rolling 750° C. to 550° C. average cooling rate (° C./s) | Hot rolling Coiling temp. (° C.) | Annealing Heating temp. (° C.) | Annealing 750° C. to 550° C. average cooling rate (° C./s) |
|---|---|---|---|---|---|---|---|
| A | 394 | 1281 | 882 | 46.3 | 455 | 850 | 48.1 |
| A | 89 | 1309 | 839 | 44.5 | 352 | 803 | 43.8 |
| A | 75 | 1343 | 847 | 47.7 | 393 | — | — |
| A | −95 | 1155 | 949 | 44.8 | 57 | 846 | 9.8 |
| B | 282 | 1110 | 972 | 42.8 | 463 | — | — |
| B | 30 | 1263 | 883 | 42.9 | 471 | 762 | 15.7 |
| B | 250 | 1111 | 868 | 46.9 | 370 | 803 | 47.0 |
| B | 100 | 1106 | 902 | 47.7 | 379 | 751 | 42.1 |
| C | 144 | 1163 | 812 | 45.6 | 462 | 822 | 11.5 |
| C | 134 | 1282 | 898 | 43.0 | 460 | 791 | 47.5 |
| C | −471 | 1260 | 875 | 28.9 | 98 | — | — |
| D | −184 | 1272 | 897 | 28.1 | 473 | 873 | 45.6 |
| D | 290 | 1235 | 967 | 46.7 | 64 | 892 | 45.9 |
| D | 477 | 1123 | 934 | 47.2 | 465 | — | — |
| E | −461 | 1143 | 814 | 47.0 | 446 | 738 | 11.0 |
| E | 189 | 1134 | 806 | 47.2 | 79 | 749 | 45.6 |
| E | −435 | 1310 | 844 | 44.4 | 165 | — | — |
| E | −359 | 1289 | 805 | 12.4 | 444 | 785 | 45.5 |
| F | −379 | 1127 | 843 | 10.5 | 417 | — | — |

TABLE 2-continued

| | | | | | | | |
|---|---|---|---|---|---|---|---|
| F | −26 | 1166 | 881 | 12.1 | 77 | 837 | 45.4 |
| F | −101 | 1286 | 864 | 45.6 | 469 | 857 | 29.8 |
| G | −242 | 1340 | 934 | 45.0 | 422 | 847 | 46.4 |
| G | −530 | 1190 | 860 | 43.0 | 466 | 824 | 45.8 |
| G | −467 | 1322 | 912 | 39.9 | 474 | 810 | 46.0 |

TABLE 3

| | | | | Continuous casting | | |
|---|---|---|---|---|---|---|
| Steel type | Steel No. | Steel sheet | Classification | Iron oxide wire diameter (mm) | Position of center of iron oxide wire (mm) | Distance of iron oxide wire (mm) |
| G | 25 | Hot rolled sheet | Ex. | 12 | 21 | 38 |
| H | 26 | Cold rolled sheet | Ex. | 14 | 16 | 15 |
| H | 27 | Cold rolled sheet | Comp. ex. | 14 | 44 | 42 |
| H | 28 | Cold rolled sheet | Comp. ex. | 40 | 65 | 64 |
| H | 29 | Cold rolled sheet | Ex. | 17 | 41 | 40 |
| H | 30 | Hot rolled sheet | Ex. | 11 | 31 | 38 |
| I | 31 | Hot rolled sheet | Ex. | 2 | 15 | 28 |
| I | 32 | Cold rolled sheet | Ex. | 42 | 51 | 50 |
| I | 33 | Cold rolled sheet | Ex. | 39 | 52 | 50 |
| J | 34 | Cold rolled sheet | Ex. | 21 | 37 | 51 |
| J | 35 | Cold rolled sheet | Ex. | 40 | 55 | 42 |
| J | 36 | Hot dip galvannealed steel sheet | Ex. | 49 | 77 | 77 |
| K | 37 | Cold rolled sheet | Ex. | 35 | 65 | 63 |
| K | 38 | Cold rolled sheet | Ex. | 23 | 23 | 33 |
| K | 39 | Cold rolled sheet | Ex. | 26 | 54 | 46 |
| L | 40 | Hot dip galvannealed steel sheet | Ex. | 11 | 39 | 21 |
| L | 41 | Cold rolled sheet | Ex. | 3 | 33 | 7 |
| L | 42 | Cold rolled sheet | Ex. | 6 | 36 | 16 |
| M | 43 | Cold rolled sheet | Ex. | 9 | 28 | 38 |
| M | 44 | Cold rolled sheet | Comp. ex. | 21 | 28 | 36 |
| M | 45 | Hot dip galvanized steel sheet | Ex. | 49 | 60 | 68 |
| M | 46 | Cold rolled sheet | Ex. | 15 | 37 | 30 |
| N | 47 | Cold rolled sheet | Ex. | 34 | 40 | 55 |
| N | 48 | Electroplated steel sheet | Ex. | 9 | 38 | 19 |

| Steel type | Continuous casting Difference of feed rate of iron oxide wire and flow rate of molten steel (mm/min) | Hot rolling Heating temp. (° C.) | Hot rolling Finish temp. of hot rolling (° C.) | Hot rolling 750° C. to 550° C. average cooling rate (° C./s) | Hot rolling Coiling temp. (° C.) | Annealing Heating temp. (° C.) | Annealing 750° C. to 550° C. average cooling rate (° C./s) |
|---|---|---|---|---|---|---|---|
| G | −41 | 1225 | 890 | 35.8 | 475 | — | — |
| H | 3 | 1238 | 950 | 46.7 | 369 | 760 | 41.9 |
| H | 521 | 1124 | 893 | 46.4 | 42 | 776 | 45.9 |
| H | −10 | 1227 | 933 | 9.6 | 64 | 780 | 1.0 |
| H | 21 | 1190 | 824 | 47.0 | 439 | 780 | 45.3 |
| H | −219 | 1308 | 863 | 44.5 | 275 | — | — |
| I | 75 | 1213 | 836 | 43.4 | 66 | — | — |
| I | 464 | 1213 | 874 | 10.5 | 106 | 838 | 42.7 |
| I | −198 | 1169 | 837 | 45.5 | 81 | 896 | 45.6 |
| J | 230 | 1307 | 961 | 13.2 | 463 | 763 | 47.3 |
| J | −312 | 1266 | 930 | 35.9 | 64 | 801 | 19.2 |
| J | −336 | 1199 | 893 | 48.3 | 468 | 772 | 45.3 |
| K | −438 | 1202 | 905 | 46.6 | 290 | 827 | 28.7 |
| K | −139 | 1153 | 959 | 46.2 | 416 | 835 | 46.4 |
| K | 218 | 1202 | 907 | 18.4 | 437 | 857 | 44.3 |
| L | −210 | 1314 | 929 | 44.6 | 446 | 846 | 38.0 |
| L | 144 | 1141 | 893 | 27.7 | 450 | 847 | 44.3 |
| L | −266 | 1133 | 854 | 42.6 | 65 | 846 | 44.8 |
| M | −286 | 1321 | 918 | 19.2 | 454 | 885 | 42.2 |
| M | −430 | 1247 | 917 | 1.3 | 270 | 885 | 45.1 |
| M | −358 | 1176 | 975 | 19.3 | 469 | 792 | 29.2 |

TABLE 3-continued

| | | | | | | | |
|---|---|---|---|---|---|---|---|
| M | 27 | 1337 | 915 | 9.1 | 450 | 863 | 45.7 |
| N | 339 | 1292 | 880 | 42.1 | 83 | 857 | 44.3 |
| N | −82 | 1297 | 814 | 46.2 | 458 | 878 | 46.8 |

TABLE 4

| Steel type | Steel No. | Steel sheet | Classification | Continuous casting | | | |
|---|---|---|---|---|---|---|---|
| | | | | Iron oxide wire diameter (mm) | Position of center of iron oxide wire (mm) | Distance of iron oxide wire (mm) | Difference of feed rate of iron oxide wire and flow rate of molten steel (mm/min) |
| N | 49 | Cold rolled sheet | Ex. | 23 | 42 | 46 | 170 |
| O | 50 | Cold rolled sheet | Ex. | 18 | 47 | 25 | 458 |
| O | 51 | Cold rolled sheet | Ex. | 26 | 54 | 46 | −148 |
| O | 52 | Cold rolled sheet | Ex. | 19 | 48 | 43 | 429 |
| P | 53 | Cold rolled sheet | Comp. ex. | 47 | 48 | 76 | 289 |
| Q | 54 | Cold rolled sheet | Comp. ex. | 6 | 21 | 35 | 432 |
| C | 55 | Cold rolled sheet | Comp. ex. | 34 | 26 | 48 | −42 |
| D | 56 | Cold rolled sheet | Comp. ex. | 8 | 17 | 37 | −124 |
| F | 57 | Cold rolled sheet | Comp. ex. | 47 | 47 | 106 | 7 |
| R | 58 | Cold rolled sheet | Ex. | 32 | 51 | 36 | 111 |
| R | 59 | Cold rolled sheet | Ex. | 29 | 37 | 41 | −52 |
| S | 60 | Cold rolled sheet | Ex. | 41 | 45 | 44 | −44 |
| S | 61 | Cold rolled sheet | Ex. | 39 | 55 | 52 | −186 |
| T | 62 | Cold rolled sheet | Ex. | 33 | 36 | 35 | 17 |
| T | 63 | Cold rolled sheet | Ex. | 29 | 40 | 41 | −144 |
| D | 64 | Cold rolled sheet | Comp. ex. | 27 | 62 | 45 | 414 |
| A | 65 | Hot rolled sheet | Comp. ex. | 0.5 | 29 | 20 | −10 |
| B | 66 | Hot rolled sheet | Comp. ex. | 55 | 59 | 56 | 21 |
| C | 67 | Hot rolled sheet | Comp. ex. | 31 | 24 | 40 | −219 |
| D | 68 | Hot rolled sheet | Comp. ex. | 40 | 78 | 43 | 75 |
| E | 69 | Hot rolled sheet | Comp. ex. | 30 | 40 | 26 | 464 |
| F | 70 | Hot rolled sheet | Comp. ex. | 43 | 55 | 78 | −198 |
| G | 71 | Hot rolled sheet | Comp. ex. | 36 | 42 | 49 | −544 |
| H | 72 | Hot rolled sheet | Comp. ex. | 16 | 26 | 23 | 516 |

| Steel type | Hot rolling | | | | Annealing | |
|---|---|---|---|---|---|---|
| | Heating temp. (° C.) | Finish temp. of hot rolling (° C.) | 750° C. to 550° C. average cooling rate (° C./s) | Coiling temp. (° C.) | Heating temp. (° C.) | 750° C. to 550° C. average cooling rate (° C./s) |
| N | 1190 | 939 | 46.0 | 171 | 886 | 46.3 |
| O | 1128 | 853 | 36.2 | 162 | 751 | 45.7 |
| O | 1249 | 938 | 45.5 | 283 | 770 | 46.5 |
| O | 1237 | 815 | 47.2 | 470 | 832 | 47.2 |
| P | 1206 | 951 | 46.1 | 443 | 824 | 17.9 |
| Q | 1288 | 836 | 47.1 | 477 | 729 | 35.8 |
| C | 1306 | 978 | 46.9 | 441 | 835 | 41.7 |
| D | 1345 | 962 | 39.8 | 480 | 762 | 38.9 |
| F | 1288 | 919 | 10.7 | 442 | 864 | 7.5 |
| R | 1179 | 897 | 22.7 | 523 | 808 | 9.8 |
| R | 1310 | 934 | 49.9 | 517 | 774 | 41.0 |
| S | 1307 | 893 | 44.9 | 513 | 841 | 29.8 |
| S | 1266 | 933 | 33.8 | 542 | 824 | 19.2 |
| T | 1297 | 915 | 43.8 | 483 | 857 | 44.8 |
| T | 1190 | 880 | 32.5 | 494 | 843 | 44.3 |
| D | 1213 | 914 | 42.4 | 418 | 862 | 41.4 |
| A | 1273 | 912 | 43.0 | 528 | — | — |
| B | 1229 | 886 | 39.9 | 490 | — | — |
| C | 1279 | 901 | 35.8 | 516 | — | — |
| D | 1190 | 939 | 46.7 | 533 | — | — |
| E | 1182 | 953 | 46.4 | 446 | — | — |

TABLE 4-continued

| | | | | | | |
|---|---|---|---|---|---|---|
| | F | 1294 | 908 | 9.6 | 450 | — | — |
| | G | 1217 | 885 | 47.0 | 510 | — | — |
| | H | 1206 | 815 | 44.5 | 544 | — | — |

TABLE 5

| Steel type | No. | Composition at thickness ¼ position (mass %) |||||||||||||||
|---|---|---|---|---|---|---|---|---|---|---|---|---|---|---|---|---|
| | | C | Si | Mn | P | S | N | O | Al | B | Ti | Nb | V | Mo | Cr | Ni | Cu |
| A | 1 | 0.518 | 0.06 | 0.9 | 0.0823 | 0.0030 | 0.0006 | 0.002 | 0.005 | 0.0074 | 0.062 | 0.025 | 0.03 | 0.07 | 0.25 | 0.095 | 0.160 |
| A | 2 | 0.518 | 0.06 | 0.9 | 0.0823 | 0.0030 | 0.0006 | 0.002 | 0.005 | 0.0074 | 0.063 | 0.025 | 0.03 | 0.07 | 0.25 | 0.095 | 0.160 |
| A | 3 | 0.516 | 0.06 | 0.9 | 0.0823 | 0.0030 | 0.0006 | 0.002 | 0.005 | 0.0074 | 0.062 | 0.025 | 0.03 | 0.07 | 0.25 | 0.095 | 0.160 |
| A | 4 | 0.521 | 0.06 | 0.9 | 0.0823 | 0.0030 | 0.0006 | 0.002 | 0.005 | 0.0074 | 0.063 | 0.025 | 0.03 | 0.07 | 0.25 | 0.095 | 0.160 |
| B | 5 | 0.670 | 1.09 | 1.0 | 0.0081 | 0.0083 | 0.0052 | 0.007 | 0.004 | 0.0006 | 0.018 | 0.110 | 0.03 | 0.53 | 0.76 | 0.108 | 0.543 |
| B | 6 | 0.667 | 1.10 | 1.0 | 0.0081 | 0.0083 | 0.0052 | 0.008 | 0.004 | 0.0006 | 0.018 | 0.110 | 0.03 | 0.53 | 0.76 | 0.108 | 0.543 |
| B | 7 | 0.679 | 1.10 | 1.0 | 0.0081 | 0.0083 | 0.0052 | 0.008 | 0.004 | 0.0006 | 0.018 | 0.110 | 0.03 | 0.53 | 0.76 | 0.108 | 0.543 |
| B | 8 | 0.672 | 1.10 | 1.0 | 0.0081 | 0.0083 | 0.0052 | 0.008 | 0.004 | 0.0006 | 0.018 | 0.110 | 0.03 | 0.53 | 0.76 | 0.108 | 0.543 |
| C | 9 | 0.363 | 1.82 | 2.8 | 0.0106 | 0.0043 | 0.0075 | 0.014 | 0.006 | — | — | — | — | — | — | — | — |
| C | 10 | 0.360 | 1.82 | 2.8 | 0.0106 | 0.0043 | 0.0075 | 0.014 | 0.006 | — | — | — | — | — | — | — | — |
| C | 11 | 0.367 | 1.80 | 2.8 | 0.0106 | 0.0043 | 0.0075 | 0.011 | 0.006 | — | — | — | — | — | — | — | — |
| D | 12 | 0.083 | 2.05 | 4.2 | 0.0728 | 0.0257 | 0.0011 | 0.003 | 0.005 | 0.0011 | 0.024 | 0.024 | 0.15 | 0.12 | 0.15 | 0.073 | 0.080 |
| D | 13 | 0.084 | 2.04 | 4.3 | 0.0728 | 0.0257 | 0.0011 | 0.002 | 0.005 | 0.0011 | 0.024 | 0.024 | 0.15 | 0.12 | 0.15 | 0.073 | 0.080 |
| D | 14 | 0.082 | 2.07 | 4.3 | 0.0728 | 0.0257 | 0.0011 | 0.003 | 0.005 | 0.0011 | 0.024 | 0.024 | 0.15 | 0.12 | 0.15 | 0.073 | 0.080 |
| E | 15 | 0.314 | 0.79 | 5.3 | 0.0110 | 0.0026 | 0.0008 | 0.001 | 0.039 | — | — | — | — | — | — | — | — |
| E | 16 | 0.313 | 0.78 | 5.3 | 0.0110 | 0.0026 | 0.0008 | 0.001 | 0.039 | — | — | — | — | — | — | — | — |
| E | 17 | 0.313 | 0.79 | 5.3 | 0.0110 | 0.0026 | 0.0008 | 0.001 | 0.039 | — | — | — | — | — | — | — | — |
| E | 18 | 0.313 | 0.78 | 5.3 | 0.0110 | 0.0026 | 0.0008 | 0.001 | 0.039 | — | — | — | — | — | — | — | — |
| F | 19 | 0.567 | 2.42 | 0.7 | 0.0074 | 0.0047 | 0.0005 | 0.001 | 0.043 | 0.0009 | 0.021 | 0.037 | 0.03 | 0.19 | 1.58 | 0.049 | 0.078 |
| F | 20 | 0.572 | 2.42 | 0.7 | 0.0074 | 0.0047 | 0.0005 | 0.001 | 0.043 | 0.0009 | 0.021 | 0.037 | 0.03 | 0.19 | 1.58 | 0.049 | 0.078 |
| F | 21 | 0.572 | 2.46 | 0.7 | 0.0074 | 0.0047 | 0.0005 | 0.001 | 0.042 | 0.0009 | 0.021 | 0.037 | 0.03 | 0.19 | 1.58 | 0.049 | 0.078 |
| G | 22 | 0.691 | 1.61 | 0.7 | 0.0057 | 0.0062 | 0.0009 | 0.003 | 0.006 | 0.0056 | 0.026 | 0.033 | 0.02 | 0.82 | 0.19 | 0.259 | 0.284 |
| G | 23 | 0.704 | 1.62 | 0.7 | 0.0057 | 0.0062 | 0.0009 | 0.004 | 0.006 | 0.0056 | 0.026 | 0.033 | 0.02 | 0.82 | 0.19 | 0.259 | 0.284 |
| G | 24 | 0.691 | 1.64 | 0.7 | 0.0057 | 0.0062 | 0.0009 | 0.004 | 0.006 | 0.0056 | 0.026 | 0.033 | 0.02 | 0.82 | 0.19 | 0.259 | 0.284 |

TABLE 6

| Steel type | No. | Composition at thickness ¼ position (mass %) |||||||||||||||
|---|---|---|---|---|---|---|---|---|---|---|---|---|---|---|---|---|
| | | C | Si | Mn | P | S | N | O | Al | B | Ti | Nb | V | Mo | Cr | Ni | Cu |
| G | 25 | 0.699 | 1.61 | 0.7 | 0.0057 | 0.0062 | 0.0009 | 0.004 | 0.006 | 0.0056 | 0.026 | 0.033 | 0.02 | 0.82 | 0.19 | 0.259 | 0.284 |
| H | 26 | 0.632 | 0.98 | 1.2 | 0.0095 | 0.0137 | 0.0011 | 0.008 | 0.004 | — | — | — | — | — | — | — | — |
| H | 27 | 0.632 | 0.99 | 1.2 | 0.0095 | 0.0137 | 0.0011 | 0.008 | 0.004 | — | — | — | — | — | — | — | — |
| H | 28 | 0.631 | 0.99 | 1.2 | 0.0095 | 0.0137 | 0.0011 | 0.008 | 0.004 | — | — | — | — | — | — | — | — |
| H | 29 | 0.621 | 0.99 | 1.2 | 0.0095 | 0.0137 | 0.0011 | 0.008 | 0.004 | — | — | — | — | — | — | — | — |
| H | 30 | 0.628 | 0.99 | 1.2 | 0.0095 | 0.0137 | 0.0011 | 0.008 | 0.004 | — | — | — | — | — | — | — | — |
| I | 31 | 0.495 | 0.21 | 0.6 | 0.0193 | 0.0369 | 0.0081 | 0.001 | 0.005 | 0.0005 | 0.112 | 0.157 | 0.02 | 0.06 | 0.37 | 0.048 | 0.094 |
| I | 32 | 0.496 | 0.21 | 0.6 | 0.0193 | 0.0369 | 0.0081 | 0.001 | 0.005 | 0.0005 | 0.111 | 0.157 | 0.02 | 0.06 | 0.37 | 0.048 | 0.094 |
| I | 33 | 0.494 | 0.21 | 0.6 | 0.0193 | 0.0369 | 0.0081 | 0.001 | 0.005 | 0.0005 | 0.111 | 0.157 | 0.02 | 0.06 | 0.37 | 0.048 | 0.094 |
| J | 34 | 0.166 | 1.48 | 6.1 | 0.0061 | 0.0037 | 0.0013 | 0.001 | 0.012 | 0.0005 | 0.026 | 0.025 | 0.02 | 0.12 | 0.54 | 0.162 | 0.745 |
| J | 35 | 0.166 | 1.47 | 6.1 | 0.0061 | 0.0037 | 0.0013 | 0.001 | 0.012 | 0.0005 | 0.026 | 0.025 | 0.02 | 0.12 | 0.54 | 0.162 | 0.745 |
| J | 36 | 0.166 | 1.48 | 6.1 | 0.0061 | 0.0037 | 0.0013 | 0.001 | 0.012 | 0.0005 | 0.026 | 0.025 | 0.02 | 0.12 | 0.54 | 0.162 | 0.745 |
| K | 37 | 0.785 | 2.29 | 0.8 | 0.0080 | 0.0033 | 0.0007 | 0.003 | 0.005 | 0.0011 | 0.147 | 0.047 | 0.12 | 0.07 | 2.26 | 0.846 | 0.130 |
| K | 38 | 0.781 | 2.28 | 0.8 | 0.0080 | 0.0033 | 0.0007 | 0.003 | 0.005 | 0.0011 | 0.146 | 0.047 | 0.12 | 0.07 | 2.26 | 0.846 | 0.130 |
| K | 39 | 0.775 | 2.26 | 0.8 | 0.0080 | 0.0033 | 0.0007 | 0.002 | 0.005 | 0.0011 | 0.146 | 0.047 | 0.12 | 0.07 | 2.26 | 0.846 | 0.130 |
| L | 40 | 0.136 | 0.87 | 1.8 | 0.0157 | 0.0419 | 0.0010 | 0.001 | 0.009 | — | — | — | — | — | — | — | — |
| L | 41 | 0.138 | 0.89 | 1.8 | 0.0157 | 0.0419 | 0.0010 | 0.001 | 0.009 | — | — | — | — | — | — | — | — |
| L | 42 | 0.136 | 0.88 | 1.8 | 0.0157 | 0.0419 | 0.0010 | 0.001 | 0.009 | — | — | — | — | — | — | — | — |
| M | 43 | 0.273 | 0.61 | 1.9 | 0.0258 | 0.0054 | 0.0005 | 0.009 | 0.003 | 0.0010 | 0.028 | 0.026 | 0.04 | 0.07 | 0.17 | 0.061 | 0.110 |
| M | 44 | 0.277 | 0.62 | 1.9 | 0.0258 | 0.0054 | 0.0005 | 0.009 | 0.003 | 0.0010 | 0.028 | 0.026 | 0.04 | 0.07 | 0.17 | 0.061 | 0.110 |
| M | 45 | 0.277 | 0.61 | 1.9 | 0.0258 | 0.0054 | 0.0005 | 0.009 | 0.003 | 0.0010 | 0.028 | 0.026 | 0.04 | 0.07 | 0.17 | 0.061 | 0.110 |
| M | 46 | 0.277 | 0.61 | 1.9 | 0.0258 | 0.0054 | 0.0005 | 0.009 | 0.003 | 0.0010 | 0.028 | 0.026 | 0.04 | 0.07 | 0.17 | 0.061 | 0.110 |
| N | 47 | 0.223 | 1.63 | 2.5 | 0.0518 | 0.0050 | 0.0030 | 0.005 | 0.027 | — | — | — | — | — | — | — | — |
| N | 48 | 0.225 | 1.62 | 2.5 | 0.0518 | 0.0050 | 0.0030 | 0.005 | 0.027 | — | — | — | — | — | — | — | — |

TABLE 7

| Steel type | No. | \multicolumn{16}{c}{Composition at thickness ¼ position (mass %)} |
|---|---|---|---|---|---|---|---|---|---|---|---|---|---|---|---|---|---|
| | | C | Si | Mn | P | S | N | O | Al | B | Ti | Nb | V | Mo | Cr | Ni | Cu |
| N | 49 | 0.227 | 1.63 | 2.5 | 0.0518 | 0.0050 | 0.0030 | 0.005 | 0.027 | — | — | — | — | — | — | — | — |
| O | 50 | 0.435 | 0.37 | 0.6 | 0.0038 | 0.0035 | 0.0018 | 0.001 | 0.004 | 0.0010 | 0.025 | 0.027 | 0.03 | 0.06 | 2.47 | 0.105 | 0.075 |
| O | 51 | 0.436 | 0.36 | 0.6 | 0.0038 | 0.0035 | 0.0018 | 0.001 | 0.004 | 0.0010 | 0.025 | 0.027 | 0.03 | 0.06 | 2.47 | 0.105 | 0.075 |
| O | 52 | 0.427 | 0.37 | 0.6 | 0.0038 | 0.0035 | 0.0018 | 0.001 | 0.004 | 0.0010 | 0.025 | 0.027 | 0.03 | 0.06 | 2.47 | 0.105 | 0.075 |
| P | 53 | 0.034 | 0.44 | 1.1 | 0.0100 | 0.0030 | 0.0041 | 0.002 | 0.003 | 0.0008 | 0.028 | 0.113 | 0.02 | 0.05 | 0.19 | 0.080 | 0.103 |
| Q | 54 | 0.810 | 0.98 | 6.3 | 0.0070 | 0.0023 | 0.0010 | 0.001 | 0.022 | 0.0009 | 0.033 | 0.023 | 0.03 | 0.12 | 0.36 | 0.103 | 0.129 |
| C | 55 | 0.366 | 1.81 | 2.8 | 0.0106 | 0.0043 | 0.0075 | 0.013 | 0.006 | — | — | — | — | — | — | — | — |
| D | 56 | 0.083 | 2.04 | 4.3 | 0.0728 | 0.0257 | 0.0011 | 0.003 | 0.005 | 0.0011 | 0.024 | 0.024 | 0.15 | 0.12 | 0.15 | 0.073 | 0.080 |
| F | 57 | 0.567 | 2.43 | 0.7 | 0.0074 | 0.0047 | 0.0005 | 0.001 | 0.042 | 0.0009 | 0.021 | 0.037 | 0.03 | 0.19 | 1.58 | 0.049 | 0.078 |
| R | 58 | 0.301 | 1.79 | 5.3 | 0.0111 | 0.0028 | 0.0008 | 0.009 | 0.036 | | | | | 0.12 | 0.36 | | |
| R | 59 | 0.304 | 1.79 | 5.3 | 0.0111 | 0.0028 | 0.0008 | 0.009 | 0.036 | | | | | 0.12 | 0.36 | | |
| S | 60 | 0.165 | 1.49 | 6.0 | 0.0062 | 0.0034 | 0.0018 | 0.003 | 0.013 | 0.0018 | 0.024 | | | | | | |
| S | 61 | 0.165 | 1.49 | 6.0 | 0.0062 | 0.0034 | 0.0018 | 0.003 | 0.013 | 0.0018 | 0.024 | | | | | | |
| T | 62 | 0.230 | 1.54 | 2.4 | 0.0503 | 0.0042 | 0.0033 | 0.001 | 0.028 | | 0.006 | 0.005 | 0.01 | | | | |
| T | 63 | 0.230 | 1.54 | 2.4 | 0.0503 | 0.0042 | 0.0033 | 0.001 | 0.028 | | 0.006 | 0.005 | 0.01 | | | | |
| D | 64 | 0.080 | 1.88 | 4.0 | 0.0728 | 0.0257 | 0.0011 | 0.003 | 0.004 | 0.0011 | 0.022 | 0.024 | 0.15 | 0.12 | 0.15 | 0.073 | 0.080 |
| A | 65 | 0.527 | 0.06 | 0.9 | 0.0823 | 0.0030 | 0.0006 | 0.002 | 0.005 | 0.0074 | 0.063 | 0.025 | 0.03 | 0.07 | 0.25 | 0.095 | 0.160 |
| B | 66 | 0.680 | 1.09 | 1.0 | 0.0081 | 0.0083 | 0.0052 | 0.008 | 0.004 | 0.0006 | 0.018 | 0.110 | 0.03 | 0.53 | 0.76 | 0.108 | 0.543 |
| C | 67 | 0.367 | 1.82 | 2.8 | 0.0106 | 0.0043 | 0.0075 | 0.013 | 0.006 | | | | | | | | |
| D | 68 | 0.084 | 2.06 | 4.3 | 0.0728 | 0.0257 | 0.0011 | 0.003 | 0.005 | 0.0011 | 0.024 | 0.024 | 0.15 | 0.12 | 0.15 | 0.073 | 0.080 |
| E | 69 | 0.319 | 0.79 | 5.4 | 0.0110 | 0.0026 | 0.0008 | 0.001 | 0.039 | | | | | | | | |
| F | 70 | 0.574 | 2.45 | 0.7 | 0.0074 | 0.0047 | 0.0005 | 0.001 | 0.043 | 0.0009 | 0.021 | 0.037 | 0.03 | 0.19 | 1.58 | 0.049 | 0.078 |
| G | 71 | 0.704 | 1.64 | 0.7 | 0.0057 | 0.0062 | 0.0009 | 0.004 | 0.006 | 0.0056 | 0.026 | 0.033 | 0.02 | 0.82 | 0.19 | 0.259 | 0.284 |
| H | 72 | 0.632 | 0.99 | 1.2 | 0.0095 | 0.0137 | 0.0011 | 0.008 | 0.004 | | | | | | | | |

TABLE 8

| Steel type | No. | Classification | Si oxides at surface layer part | | | | Number density of Si oxides at thickness ½ position (/mm²) | Mechanical properties | | | | Sheet thickness (mm) | Position of surface layer part |
|---|---|---|---|---|---|---|---|---|---|---|---|---|---|
| | | | Number density (/mm²) | Average | Standard error | Ratio of deviation from average (%) | | Tensile strength (MPa) | Total elongation (%) | Tensile strength × Total elongation (MPa %) | Weld cracking | | |
| A | 1 | Ex. | 5075 | −1.2 | 0.5 | 3 | 500 | 1240 | 11 | 13640 | No | 2.4 | 2 sides |
| A | 2 | Comp. ex. | 3550 | −2.4 | 0.5 | 5 | 525 | 660 | 27 | 17820 | Yes | 1.6 | 2 sides |
| A | 3 | Ex. | 5000 | −1.3 | 0.5 | 5 | 900 | 960 | 17 | 16320 | No | 1.8 | 2 sides |
| A | 4 | Ex. | 5975 | −1.2 | 0.6 | 1 | 500 | 700 | 19 | 13300 | No | 1.4 | 2 sides |
| B | 5 | Ex. | 4400 | −1.3 | 0.4 | 5 | 675 | 2100 | 8 | 16800 | No | 0.8 | 2 sides |
| B | 6 | Comp. ex. | 6025 | −0.8 | 0.8 | 2 | 625 | 1200 | 8 | 9600 | Yes | 2.2 | 1 side |
| B | 7 | Ex. | 5200 | −1.2 | 0.4 | 5 | 625 | 1690 | 10 | 16900 | No | 1.4 | 2 sides |
| B | 8 | Ex. | 5575 | −1.3 | 0.4 | 4 | 500 | 740 | 16 | 11840 | No | 1.4 | 2 sides |
| C | 9 | Ex. | 5700 | −1.4 | 0.6 | 3 | 850 | 940 | 21 | 19740 | No | 0.8 | 1 side |
| C | 10 | Ex. | 5825 | −1.2 | 0.6 | 5 | 750 | 1030 | 18 | 18540 | No | 0.8 | 2 sides |
| C | 11 | Ex. | 5250 | −1.3 | 0.6 | 5 | 500 | 1890 | 6 | 11340 | No | 1.8 | 2 sides |
| D | 12 | Ex. | 5575 | −1.2 | 0.6 | 5 | 500 | 660 | 30 | 19800 | No | 1.0 | 2 sides |
| D | 13 | Ex. | 5600 | −1.4 | 0.6 | 5 | 500 | 910 | 22 | 20020 | No | 1.2 | 2 sides |
| D | 14 | Ex. | 5325 | −1.6 | 0.3 | 1 | 725 | 1190 | 14 | 16660 | No | 2.0 | 2 sides |
| E | 15 | Ex. | 5600 | −1.2 | 0.4 | 1 | 500 | 930 | 14 | 13020 | No | 2.0 | 1 side |
| E | 16 | Comp. ex. | 7000 | −0.9 | 0.5 | 1 | 500 | 1030 | 5 | 5150 | Yes | 2.2 | 2 sides |
| E | 17 | Ex. | 5950 | −1.2 | 0.6 | 4 | 525 | 1920 | 7 | 13440 | No | 2.2 | 2 sides |
| E | 18 | Ex. | 5275 | −1.4 | 0.4 | 2 | 550 | 1200 | 15 | 18000 | No | 1.6 | 2 sides |
| F | 19 | Ex. | 5850 | −1.2 | 0.6 | 2 | 525 | 710 | 18 | 12780 | No | 1.4 | 2 sides |
| F | 20 | Ex. | 5900 | −1.4 | 0.4 | 1 | 500 | 670 | 19 | 12730 | No | 2.2 | 2 sides |
| F | 21 | Ex. | 5725 | −1.4 | 0.5 | 1 | 525 | 1030 | 17 | 17510 | No | 2.4 | 2 sides |
| G | 22 | Ex. | 5275 | −1.2 | 0.6 | 1 | 900 | 1570 | 7 | 10990 | No | 1.6 | 2 sides |
| G | 23 | Comp. ex. | 6950 | −1.7 | 0.5 | 3 | 500 | 2210 | 3 | 6630 | Yes | 1.2 | 2 sides |
| G | 24 | Ex. | 5125 | −1.5 | 0.6 | 5 | 875 | 900 | 25 | 22500 | No | 1.2 | 2 sides |

TABLE 9

| Steel type | No. | Classification | Si oxides at surface layer part – Number density (/mm²) | Average | Standard error | Ratio of deviation from average (%) | Number density of Si oxides at thickness ½ position (/mm²) | Tensile strength (MPa) | Total elongation (%) | Tensile strength × Total elongation (MPa %) | Weld cracking | Sheet thickness (mm) | Position of surface layer part |
|---|---|---|---|---|---|---|---|---|---|---|---|---|---|
| G | 25 | Ex. | 5775 | −1.8 | 0.5 | 5 | 500 | 1980 | 11 | 21780 | No | 2.2 | 2 sides |
| H | 26 | Ex. | 3900 | −1.2 | 0.5 | 3 | 775 | 1040 | 18 | 18720 | No | 1.4 | 2 sides |
| H | 27 | Comp. ex. | 2025 | −1.5 | 0.6 | 4 | 575 | 2090 | 5 | 10450 | Yes | 1.4 | 2 sides |
| H | 28 | Comp. ex. | 5850 | −1.3 | 0.6 | 1 | 525 | 480 | 35 | 16800 | No | 2.2 | 1 side |
| H | 29 | Ex. | 4775 | −1.5 | 0.3 | 1 | 500 | 1380 | 8 | 11040 | No | 2.0 | 2 sides |
| H | 30 | Ex. | 5150 | −1.2 | 0.4 | 4 | 525 | 1980 | 11 | 21780 | No | 1.0 | 2 sides |
| I | 31 | Ex. | 4525 | −1.3 | 0.4 | 2 | 575 | 1330 | 9 | 11970 | No | 1.0 | 2 sides |
| I | 32 | Ex. | 5325 | −1.2 | 0.6 | 4 | 725 | 1370 | 9 | 12330 | No | 2.2 | 2 sides |
| I | 33 | Ex. | 5725 | −1.3 | 0.5 | 1 | 725 | 1800 | 8 | 14400 | No | 1.4 | 2 sides |
| J | 34 | Ex. | 4950 | −1.2 | 0.3 | 1 | 650 | 1480 | 12 | 17760 | No | 2.4 | 1 side |
| J | 35 | Ex. | 5275 | −1.3 | 0.6 | 5 | 500 | 1110 | 14 | 15540 | No | 1.6 | 2 sides |
| J | 36 | Ex. | 5975 | −1.2 | 0.6 | 5 | 625 | 1480 | 9 | 13320 | No | 2.0 | 2 sides |
| K | 37 | Ex. | 5725 | −1.4 | 0.5 | 3 | 500 | 810 | 30 | 24300 | No | 1.0 | 1 side |
| K | 38 | Ex. | 5650 | −1.4 | 0.6 | 4 | 500 | 970 | 24 | 23280 | No | 1.2 | 2 sides |
| K | 39 | Ex. | 5400 | −1.5 | 0.6 | 3 | 550 | 1400 | 13 | 18200 | No | 0.8 | 2 sides |
| L | 40 | Ex. | 4775 | −1.5 | 0.4 | 1 | 725 | 1100 | 24 | 26400 | No | 1.8 | 1 side |
| L | 41 | Ex. | 5275 | −1.3 | 0.4 | 3 | 500 | 1110 | 15 | 16650 | No | 2.0 | 2 sides |
| L | 42 | Ex. | 5825 | −1.6 | 0.4 | 2 | 750 | 1100 | 25 | 27500 | No | 1.6 | 2 sides |
| M | 43 | Ex. | 5575 | −1.8 | 0.5 | 1 | 900 | 1560 | 10 | 15600 | No | 2.4 | 2 sides |
| M | 44 | Comp. ex. | 4575 | −1.3 | 0.6 | 1 | 625 | 470 | 50 | 23500 | No | 0.8 | 2 sides |
| M | 45 | Ex. | 5825 | −1.2 | 0.6 | 4 | 500 | 740 | 14 | 10360 | No | 1.6 | 1 side |
| M | 46 | Ex. | 4575 | −1.5 | 0.3 | 3 | 500 | 1560 | 16 | 24960 | No | 2.4 | 2 sides |
| N | 47 | Ex. | 5000 | −1.2 | 0.6 | 1 | 525 | 920 | 15 | 13800 | No | 1.2 | 2 sides |
| N | 48 | Ex. | 5125 | −1.3 | 0.5 | 2 | 625 | 1210 | 13 | 15730 | No | 1.8 | 2 sides |

TABLE 10

| Steel type | No. | Classification | Si oxides at surface layer part – Number density (/mm²) | Average | Standard error | Ratio of deviation from average (%) | Number density of Si oxides at thickness ½ position (/mm²) | Tensile strength (MPa) | Total elongation (%) | Tensile strength × Total elongation (MPa %) | Weld cracking | Sheet thickness (mm) | Position of surface layer part |
|---|---|---|---|---|---|---|---|---|---|---|---|---|---|
| N | 49 | Ex. | 5400 | −1.4 | 0.5 | 1 | 675 | 1310 | 9 | 11790 | No | 0.8 | 2 sides |
| O | 50 | Ex. | 5850 | −1.5 | 0.4 | 1 | 500 | 780 | 27 | 21060 | No | 1.0 | 2 sides |
| O | 51 | Ex. | 5450 | −1.5 | 0.5 | 5 | 700 | 1030 | 16 | 16480 | No | 2.4 | 2 sides |
| O | 52 | Ex. | 5000 | −1.3 | 0.3 | 1 | 900 | 1620 | 15 | 24300 | No | 1.4 | 1 side |
| P | 53 | Comp. ex. | 5125 | −1.2 | 0.6 | 1 | 500 | 240 | 50 | 12000 | No | 1.2 | 2 sides |
| Q | 54 | Comp. ex. | 4325 | −1.9 | 0.6 | 5 | 500 | 2460 | 4 | 9840 | No | 0.8 | 1 side |
| C | 55 | Comp. ex. | 2675 | −1.3 | 0.5 | 4 | 650 | 1190 | 10 | 11900 | Yes | 1.8 | 2 sides |
| D | 56 | Comp. ex. | 3950 | −1.5 | 0.6 | 2 | 500 | 490 | 37 | 18130 | No | 1.2 | 1 side |
| F | 57 | Comp. ex. | 1875 | −1.2 | 0.6 | 5 | 550 | 1650 | 11 | 18150 | Yes | 1.6 | 2 sides |
| R | 58 | Ex. | 5125 | −1.2 | 0.5 | 5 | 500 | 1290 | 9 | 11610 | No | 1.4 | 2 sides |
| R | 59 | Ex. | 4775 | −1.3 | 0.6 | 2 | 500 | 1520 | 13 | 19760 | No | 1.6 | 2 sides |
| S | 60 | Ex. | 5975 | −1.4 | 0.6 | 5 | 550 | 960 | 17 | 16320 | No | 1.6 | 2 sides |
| S | 61 | Ex. | 5900 | −1.5 | 0.3 | 4 | 625 | 700 | 19 | 13300 | No | 1.6 | 2 sides |
| T | 62 | Ex. | 4400 | −1.5 | 0.4 | 3 | 825 | 1310 | 11 | 14410 | No | 1.2 | 2 sides |
| T | 63 | Ex. | 5775 | −1.3 | 0.4 | 4 | 525 | 990 | 23 | 22770 | No | 1.4 | 2 sides |
| D | 64 | Comp. ex. | 2525 | −1.6 | 0.4 | 1 | 1050 | 870 | 11 | 9570 | Yes | 2.0 | 2 sides |
| A | 65 | Comp. ex. | 4550 | −2.3 | 0.6 | 4 | 550 | 1310 | 10 | 13100 | Yes | 3.6 | 2 sides |
| B | 66 | Comp. ex. | 6100 | −0.9 | 0.7 | 4 | 650 | 2200 | 4 | 8800 | Yes | 2.8 | 1 side |
| C | 67 | Comp. ex. | 2225 | −1.2 | 0.6 | 2 | 625 | 1250 | 9 | 11250 | Yes | 3.4 | 2 sides |
| D | 68 | Comp. ex. | 2600 | −1.4 | 0.5 | 3 | 1075 | 790 | 12 | 9480 | Yes | 3.0 | 1 side |
| E | 69 | Comp. ex. | 7075 | −0.8 | 0.6 | 4 | 825 | 1130 | 8 | 9040 | Yes | 3.0 | 2 sides |
| F | 70 | Comp. ex. | 1925 | −1.3 | 0.5 | 2 | 525 | 1950 | 6 | 11700 | Yes | 3.2 | 2 sides |
| G | 71 | Comp. ex. | 6550 | −1.6 | 0.5 | 1 | 775 | 2330 | 3 | 6990 | Yes | 3.2 | 2 sides |
| H | 72 | Comp. ex. | 2075 | −1.5 | 0.6 | 3 | 550 | 1990 | 6 | 11940 | Yes | 2.8 | 2 sides |

In the steel sheets of Comparative Examples 2 and 65, the diameters of the wires added in the continuous casting process are smaller than 1 mm and the averages of the logarithmic values of the particle sizes of the Si oxides of the surface layer parts are smaller than −2.0. As a result, in the steel sheets of these comparative examples, the tensile strength×total elongation's are 10000 MPa % or more, but the weldabilities are not improved.

In the steel sheets of Comparative Examples 6 and 66, the diameters of the wires added in the continuous casting process are larger than 50 mm, the averages of the logarithmic values of the particle sizes of the Si oxides of the surface layer parts are larger than −1.2, and the standard errors are larger than 0.6. As a result, in the steel sheets of these comparative examples, the tensile strength×total elongation's are less than 10000 MPa % and the weldabilities are not improved.

In the steel sheets of Comparative Examples 16 and 69, the distances between wires added in the continuous casting process are smaller than the wire diameters, the number densities of Si oxides of the surface layer parts are larger than 6000/mm$^2$, and the averages of the logarithmic values of the particle sizes are larger than −1.2. As a result, the tensile strength×total elongation's are less than 10000 MPa % and but the weldabilities are not improved.

In the steel sheets of Comparative Examples 23 and 71, the differences of the feed rates of the wires added in the continuous casting process and the flow rates of molten steels are smaller than −500 mm/min and the number densities of the Si oxides of the surface layer parts are larger than 6000/mm$^2$. As a result, the tensile strength×total elongation's are less than 10000 MPa % and the weldabilities are not improved.

Further, in the steel sheets of Comparative Examples 27 and 72, the differences of the feed rates of the wires added in the continuous casting process and the flow rates of molten steels are larger than 500 mm/min and the number densities of the Si oxides of the surface layer parts are smaller than 3000/mm$^2$. As a result, the tensile strength×total elongation's are 10000 MPa % or more and the weldabilities are not improved. In contrast to this, in the steel sheets in the examples of the present invention satisfying the requirement of the difference of the feed rate of the wire and the flow rate of molten being −500 mm/min or more and 500 mm/min or less, the number density of the Si oxides satisfies the above requirement and the weldability is improved without lowering the tensile strength×total elongation.

In the steel sheets of Comparative Examples 28 and 44, the average cooling rates at 750° C. to 550° C. in the hot rolling process or annealing process are smaller than 2.5° C./s. As a result, in these steel sheets, the tensile strengths are lower than 600 MPa.

In the steel sheets of Comparative Examples 53 and 54, the concentrations of C do not satisfy the requirements of the present embodiment. As a result, in these steel sheets, the requirements of the tensile strength and tensile strength×total elongation are not satisfied.

In the steel sheets of Comparative Examples 55 and 67, the distances between the center positions of the wires added in the continuous casting process and the surfaces of the molten steels are smaller than the wire diameters and the number densities of the Si oxides of the surface layer parts fall below 3000/mm$^2$. As a result, the weldabilities are low.

In the steel sheet of Comparative Examples 56, the heating temperature in the annealing process is lower than the Ac3 point−50° C., so the tensile strength is lower than 600 MPa.

In the steel sheets of Comparative Examples 57 and 70, the distances between wires added in the continuous casting process are larger than the wire diameters+30 mm and the number densities of Si oxides of the surface layer parts are smaller than 3000/mm$^2$. As a result, the tensile strength× total elongation's are 10000 MPa % or more, but the weldabilities are not improved.

In the steel sheets of Comparative Examples 64 and 68, the distances between the center positions of the wires added in the continuous casting process and the surfaces of the molten steels are larger than the wire diameters+30 mm, so the number densities of the Si oxides of the surface layer parts fall below 3000/mm$^2$ and the number densities of the Si oxides of the positions of ½ of the thickness of the steel sheets rise above 1000/mm$^2$. As a result, the tensile strength×total elongation's are less than 10000 MPa % and the weldabilities are not improved.

In contrast to this, the steel sheets of the examples satisfying the chemical constituents and method of manufacture of the present invention have number densities of Si oxides satisfying predetermined requirements and could be confirmed as being improved in weldability without lowering the tensile strength×total elongation.

In the above way, according to the present invention, it was confirmed that steel sheet obtaining both formability and weldability by modification of the surface layer part was obtained.

INDUSTRIAL APPLICABILITY

According to the present invention, it is possible to provide steel sheet excellent in formability and weldability. Such steel sheet of the present invention is suitable, for example, for a structural material in the field of automobiles and other transport machinery.

REFERENCE SIGNS LIST 1 molten steel
2 wire
11 tundish
12 continuous casting machine

The invention claimed is:

1. A steel sheet with a tensile strength of 600 MPa or more,
a region down to 30 μm from a surface of the steel sheet in a sheet thickness direction being defined as a "surface layer part",
at the surface layer part of at least one side,
particle size 20 nm or more Si oxide grains being present in a 3000 to 6000/mm$^2$ number density,
an average of natural logarithms of the particle sizes of the Si oxide grains measured in μm units being −2.0 to −1.2, a standard error of the natural logarithms of the particle sizes being 0.6 or less,
a number of Si oxide grains with deviations of the natural logarithms of the particle sizes from the average of larger than 2 times the standard error being 5% or less of the total number of Si oxide grains with particle sizes of 20 nm or more
a chemical composition at a position of ¼ of the thickness from the surface of the steel sheet comprising, by mass %,
C: 0.050 to 0.800%,
Si: 0.01 to 2.50%,
Mn: 0.01 to 8.0%,
P: 0.1000% or less,
S: 0.0500% or less,
Al: 0.050% or less,
N: 0.0100% or less,
O: 0 to 0.020%,
Cr: 0 to 3.00%,
Mo: 0 to 1.00%,
B: 0 to 0.0100%, Ti: 0 to 0.200%,
Nb: 0 to 0.200%,
V: 0 to 0.20%,
Cu: 0 to 1.000%,
Ni: 0 to 1.000%, and
bal.: Fe and impurities, and
a number density of Si oxide grains at a position of ½ of the thickness of the steel sheet being $1000/mm^2$ or less.

2. The steel sheet according to claim 1, wherein the chemical composition further comprises at least one element of
Cr: 0.01 to 3.00%,
Mo: 0.01 to 1.00%,
B: 0.0001 to 0.0100%,
Ti: 0.010 to 0.200%,
Nb: 0.010 to 0.200%,
V: 0.01 to 0.20%,
Cu: 0.010 to 1.000%, and
Ni: 0.010 to 1.000%.

3. The steel sheet according to claim 1, wherein the steel sheet further comprises a hot dip galvanized layer, a hot dip galvannealed layer, or an electrogalvanized layer at the surface of the surface layer part.

4. The steel sheet according to claim 2, wherein the steel sheet further comprises a hot dip galvanized layer, a hot dip galvannealed layer, or an electrogalvanized layer at the surface of the surface layer part.

\* \* \* \* \*